UNITED STATES PATENT OFFICE.

BRUNO BEYER, OF LUDWIGSHAFEN, GERMANY, AND FRIEDRICH SCHAAR-ROSENBERG, OF MANCHESTER, ENGLAND, ASSIGNORS TO THE BADISCHE ANILIN AND SODA FABRIK, OF LUDWIGSHAFEN, GERMANY.

BLUE-GREEN OXAZIN DYE.

SPECIFICATION forming part of Letters Patent No. 654,087, dated July 17, 1900.

Application filed April 23, 1900. Serial No. 14,018. (No specimens.)

*To all whom it may concern:*

Be it known that we, BRUNO BEYER, doctor of philosophy, a subject of the King of Saxony, residing at Ludwigshafen-on-the-Rhine, Kingdom of Bavaria, Empire of Germany, and FRIEDRICH SCHAAR-ROSENBERG, doctor of philosophy, a subject of the Czar of Russia, residing at Manchester, England, have invented new and useful Improvements in Blue-Green Mordant-Dyeing Coloring-Matters, of which the following is a specification.

Our invention relates to the manufacture of a new blue-green coloring-matter, probably of the oxazin class, which can be obtained by heating a nitroso alkyl-meta-amido-phenol—for instance, nitroso-dimethyl-meta-amido-phenol, nitroso-di-ethyl-meta-amido-phenol, nitroso-mono-ethyl-meta-amido-phenol—in aqueous or dilute acid solution in the presence of a reducing agent. As instances of the reducing agents that can be employed we mention stannous chlorid and ferrous salts. We prefer as a rule to use the former.

The following example will serve to further illustrate the nature of this invention and the manner in which it may be carried into practical effect. The parts are by weight.

Example: Mix about twelve (12) parts of the hydrochlorid of nitroso-di-ethyl-meta-amido-phenol with sixty (60) parts of water and add about five (5) parts of crytallized stannous chlorid. Stir the mixture for about an hour while heating on the boiling-water bath. A green mixture containing the coloring-matter is obtained. To isolate the coloring-matter, treat the said mixture with dilute hydrochloric acid and filter the precipitate obtained. Stir the precipitate after collecting it into a cold dilute solution of carbonate of soda. The coloring-matter dissolves, giving a deep-blue solution. Filter from any insoluble matter that may be present and precipitate the coloring-matter with common salt. The corresponding coloring-matters can be obtained in a similar way when using the other nitroso-alkyl-amido-phenols mentioned.

Our new coloring-matter is thus obtained as sodium salt and is a dark powder soluble in water and in a dilute solution of carbonate of soda with a blue to blue-violet color. It is characterized and differentiated from all similar dyestuffs by its behavior on treating in solution with hydrochloric acid. The coloring-matter then yields either a brilliant-green solution or with concentrated solutions a brilliant-green precipitate. With the ordinary metallic mordants it forms stable lakes and dyes chrome mordanted wool and silk, giving shades which are very fast to milling and to light. If desired, the wool can be dyed with the coloring-matter before being mordanted and the dyed goods subsequently treated with chromium salts. The new dyestuff can also be used for dyeing chrome mordanted cotton and for printing cotton—for instance, when mixed in the printing mass with chrome salts.

Now what we claim is—

As a new dyestuff the new blue-green coloring-matter, which can be obtained by heating a solution of a specified nitroso-alkyl-meta-amido-phenol in the presence of a reducing agent and which in the form of its sodium salt is a dark powder soluble in water with a blue to blue-violet color, the said solution on addition of hydrochloric acid turning brilliant green and which dyes on chrome mordants giving blue-green shades substantially as described.

In testimony whereof we have hereunto set our hands in the presence of the subscribing witnesses.

BRUNO BEYER.
FRIEDRICH SCHAAR-ROSENBERG.

Witnesses to the signature of Bruno Beyer:
ERNEST F. EHRHARDT,
PERCY J. JONES.

Witnesses to the signature of Friedrich Schaar-Rosenberg:
JOHN WILLIAM THOMAS,
ERNALD SIMPSON MOSELEY.